US010060356B2

(12) United States Patent
Bond

(10) Patent No.: US 10,060,356 B2
(45) Date of Patent: Aug. 28, 2018

(54) ROTATIONAL MACHINE, SUCH AS A TURBOMACHINE, AND ENGINES AND FLYING MACHINES INCORPORATING SAME

(71) Applicant: Reaction Engines Ltd, Abingdon (GB)

(72) Inventor: Alan Bond, Abingdon (GB)

(73) Assignee: Reaction Engines Ltd, Abingdon (GB)

( * ) Notice: Subject to any disclaimer, the term of this patent is extended or adjusted under 35 U.S.C. 154(b) by 962 days.

(21) Appl. No.: 14/296,615

(22) Filed: Jun. 5, 2014

(65) Prior Publication Data

US 2015/0101333 A1 Apr. 16, 2015

(30) Foreign Application Priority Data

Oct. 11, 2013 (GB) .................................. 1318104.5

(51) Int. Cl.
*F02C 7/28* (2006.01)
*F02C 1/02* (2006.01)
*F01D 11/04* (2006.01)
*F02K 7/16* (2006.01)
*F02K 7/18* (2006.01)
(Continued)

(52) U.S. Cl.
CPC .............. *F02C 7/28* (2013.01); *F01D 11/04* (2013.01); *F02C 1/02* (2013.01); *F02C 1/10* (2013.01); *F02K 7/16* (2013.01); *F02K 7/18* (2013.01); *F02K 9/48* (2013.01); *F16J 15/164* (2013.01);
(Continued)

(58) Field of Classification Search
CPC ..... F02K 9/46; F02K 9/48; F02K 9/78; F02K 9/343; F05D 2260/6022
See application file for complete search history.

(56) References Cited

U.S. PATENT DOCUMENTS 2,019,632 A * 11/1935 Ray .......................... C01B 23/00
423/219
3,390,525 A * 7/1968 Spillmann ............... F01D 11/04
376/310
(Continued)

FOREIGN PATENT DOCUMENTS

DE 102005061328 A1 6/2007
GB 537077 A 6/1941
(Continued)

OTHER PUBLICATIONS

Varvill, R., and Bond, A., "The Skylon Spaceplane: Progress to Realisation", Journal of the British Interplanetary Society (JBIS), vol. 61, 2008, pp. 412-418.*
(Continued)

*Primary Examiner* — Lorne Meade
(74) *Attorney, Agent, or Firm* — Covington & Burling LLP; Melody Wu; Grant D. Johnson

(57) ABSTRACT

A rotational machine such as a turbocompressor has a fluid recovery system for recovering leaked working fluid such as gaseous helium in a helium circuit which has leaked past a shaft seal, a purifier being provided for removing contaminants from the working fluid, and turbocompressor may have one fluid such as helium or hydrogen working through one turbo component such as a turbine thereof and a second working fluid such as air or helium working through a second turbo component such as a compressor thereof, the rotational machine being installable in an engine of a flying machine.

22 Claims, 3 Drawing Sheets

(51) Int. Cl.
*F02K 9/48* (2006.01)
*F02C 1/10* (2006.01)
*F16J 15/16* (2006.01)
*F02K 9/78* (2006.01)

(52) U.S. Cl.
CPC ........ *F02K 9/78* (2013.01); *F05D 2260/6022* (2013.01)

(56) References Cited

U.S. PATENT DOCUMENTS

| | | | |
|---|---|---|---|
| 4,005,580 A | 2/1977 | Swearingen | |
| 4,065,352 A * | 12/1977 | Iwano | G21C 3/17 252/181.3 |
| 4,464,908 A | 8/1984 | Landerman et al. | |
| 4,779,413 A | 10/1988 | Mouton | |
| 4,793,141 A * | 12/1988 | Yanai | F01D 11/04 60/646 |
| 5,156,534 A * | 10/1992 | Burgy | F02K 9/48 415/60 |
| 6,443,690 B1 * | 9/2002 | Zabrecky | F01D 3/04 415/107 |
| 8,375,719 B2 * | 2/2013 | Rhodes | F01D 11/06 60/646 |
| 8,397,506 B1 | 3/2013 | Wright et al. | |
| 9,488,051 B2 * | 11/2016 | Maeda | F01D 3/04 |
| 2013/0142671 A1 | 6/2013 | Stein et al. | |
| 2014/0023478 A1 * | 1/2014 | Maeda | F01D 3/04 415/1 |
| 2014/0119881 A1 | 5/2014 | Kalra et al. | |

FOREIGN PATENT DOCUMENTS

| | | |
|---|---|---|
| GB | 1008328 A | 10/1965 |
| GB | 1038575 A | 8/1966 |
| GB | 1164201 A | 9/1969 |
| GB | 1214892 A | 12/1970 |
| GB | 1275756 A | 5/1972 |
| JP | S51143114 A | 12/1976 |
| JP | S6427609 A | 1/1989 |
| JP | H0491325 A | 3/1992 |
| WO | WO-2004/076821 A1 | 9/2004 |
| WO | WO-2006/007615 A1 | 1/2006 |
| WO | WO-2013/030988 A1 | 3/2013 |
| WO | WO-2014/063893 A1 | 5/2014 |

OTHER PUBLICATIONS

Webber, H., Feast, S., and Bond, A., "Heat Exchanger Design in Combined Cycle Engines", International Astronautical Congress (IAC), IAC-08-C4.5.1, 2008, pp. 1-15.*
UK Intellectual Property Office Search Report for Ser. No. GB1318104.5 dated May 15, 2014.
PCT Invitation to Pay Additional Fees and, Where Applicable, Protest Fee with Partial International Search Report for PCT/GB2014/000410, dated Jan. 21, 2015.
UK Intellectual Property Office Search Report, Ser. No. GB1318104.5, dated Apr. 29, 2015.
Second UK Intellectual Property Office Search Report, Ser. No. GB1318104.5, dated Apr. 29, 2015.
PCT International Search Report (PCT Article 18 and Rules 43 and 44) for PCT/GB2014/000410, dated Jun. 17, 2015.
PCT Written Opinion of the International Searching Authority (PCT Rule 43bis.1) for PCT/GB2014/000410, dated Jun. 17, 2015.

* cited by examiner

ROTATIONAL MACHINE, SUCH AS A TURBOMACHINE, AND ENGINES AND FLYING MACHINES INCORPORATING SAME

CROSS-REFERENCE TO RELATED APPLICATIONS

The present application claims priority under 35 U.S.C. § 119(a) to the following application filed in the United Kingdom on Oct. 11, 2013, which is incorporated herein by reference: GB 1318104.5.

FIELD

The present invention relates to rotational machines, such as turbomachines, and to engines and flying machines incorporating such rotational machines such as flying machines capable of high Mach (e.g. Mach 5) atmospheric cruise or single stage to orbit launches.

BACKGROUND

An example of an engine in which a turbomachine is used is the SABRE engine developed by Reaction Engines Limited, of Oxfordshire, United Kingdom.

Such an engine is for powering applications such as a single-stage-to-orbit spaceplane such as the SKYLON aircraft developed by Reaction Engines Limited. The SABRE engine has two modes of operation. At lower altitudes, the engine operates by expanding an on-board store of helium in a gaseous helium circuit past a turbine of a turbo-compressor to drive a compressor of the turbo-compressor to compress intake atmospheric air. The compressed air is mixed with hydrogen from an on-board store of liquid hydrogen and the resulting mixture is combusted and then exhausted through a nozzle to provide thrust. At higher altitudes and outside the atmosphere for transport to orbital areas, the engine operates in a full rocket mode. In this mode, instead of taking in atmospheric air, the engine mixes oxygen from an on-board store of liquid oxygen with the hydrogen, and combusts the mixture which is then expanded and exhausted through a rocket nozzle to provide thrust. The turbo-compressor is not used in rocket mode.

One problem to address in an arrangement such as this is the leakage of helium from the helium circuit. Such leakage is undesirable as it requires a larger store of on-board helium than would be the case if there were no leakage or less leakage. Storing less rather than more helium is desirable in minimising size and weight of an aircraft to which an engine such as this is fitted. It is extremely difficult to prevent leakage of fluid such as helium gas past a shaft bearing. In practice there will always be some leakage.

The present arrangement aims to, in effect, minimise leakage by recapturing and re-using leaked working fluid. Alternatively, the invention aims to provide a useful turbomachine.

SUMMARY

According to a first aspect of the present invention there is provided a rotational machine having a working component for communicating a working fluid from an inlet to an outlet thereof, the working component having rotor and a connector for mechanical communication from the rotor, and a working fluid recovery system for the recovery of working fluid in the region of the connector. Therefore, the working fluid (such as helium) need not be consumed or consumed so quickly during use of the machine.

The rotational machine may be adapted to operate with the working fluid in a closed loop circuit. Thus, a top-up supply tank may be omitted from the circuit, saving weight.

The rotational machine may be adapted to operate with the working fluid as gaseous helium.

The working component may be one of a turbine and a compressor.

The rotational machine may include a compressor and the connector may be adapted to form at least part of a connection between the working component and the compressor.

The compressor may be adapted to compress a second working fluid, which may be air.

The connector may comprise a rotatable shaft and a shaft seal may be provided for substantially sealing the working fluid against transmission thereof along the shaft. Despite the substantial sealing, it is likely there will still be a small amount of leakage.

The shaft seal may be located fluidly between the rotor and an inlet to the working fluid recovery system.

The rotational machine may be adapted to operate with pressure on a rotor side of the seal higher than pressure on a lower pressure side of the seal.

When the working component comprises a turbine, the seal, on a side thereof facing the rotor, may be adapted to be subjected to a working pressure substantially equal to pressure at a working fluid inlet to the turbine.

The working pressure may be over 50 Bar or over 100 Bar, for example about 200 Bar or more.

When the rotational machine includes said compressor, the compressor may have an inlet and an outlet for the second working fluid, at least one of the inlet and outlet being adapted to operate at a compressor side pressure lower than the working pressure. Therefore, a pressure gradient may be provided, with decreasing pressure along a path away from the working component. When the working component is a turbine, a pressure gradient from relatively high at the turbine to relatively low at the compressor may be created. Thus, in a case in which the rotational machine comprises a turbocompressor, any leakage may be in a direction from the turbine towards the compressor when the working fluid is arranged to pass through the turbine. Thus the working fluid (which may be gaseous helium, which may be operable in a closed helium circuit) may not be contaminated by the working fluid in the compressor, which may for example be air containing oxygen and other molecules or another fluid. In this case, when a shaft seal is provided for limiting communication between the turbine and compressor, which may have rotors on a common shaft, even if the shaft seal allows some leakage, the working fluid in the turbine is not contaminated. In some embodiments, the arrangement may be revised such that helium or another working fluid in a compressor or another rotational machine component is operated at a higher pressure than another fluid such as air or hydrogen in a turbine, again such that the pressure gradient ensures any leakage flow is away from the helium circuit (or working fluid working path). Thus, the pressure gradient may be towards a turbine in a case when the working fluid is adapted to pass a compressor on the same shaft as said turbine.

A similar arrangement may be adapted in rotational machines other than turbomachines, such as in re-generators of the rotating heat exchanger type.

The working fluid recovery system may incorporate a recovery (or auxiliary) turbine.

The recovery turbine may have an inlet path adapted to draw a working fluid from an inlet region of the working component and/or an outlet path adapted to supply working fluid to an outlet region of the working component.

The working fluid recovery system may include at least one recovery (or auxiliary) compressor. In some examples, the recovery compressor is electrically driven by a motor and may be of the reciprocating pump type. The compressor may be driven in various other ways in other embodiments.

The rotational machine may include a shaft adapted to transmit torque from a rotor of the recovery turbine to a rotor of the recovery compressor.

The recovery compressor may have an inlet path adapted to draw fluid from a recovery space bounded at least partly by the lower pressure side of the shaft seal and/or an outlet path adapted to supply working fluid to an outlet region of the working component.

The rotational machine may include a second shaft seal and the recovery space may be between the shaft seal and second shaft seal.

The working fluid recovery device may include a purifier for removing contaminants from the working fluid. This is highly advantageous, especially when the working fluid is operable in a closed circuit since, even without a leak top-up tank, a gradual increase in contamination which could damage components and adversely affect thermodynamic performance can be avoided.

A further aspect of the invention provides a machine incorporating a working fluid circuit, the working fluid circuit including a purifier for removing contaminants from the working fluid. The working fluid circuit may be a helium circuit.

The purifier may be adapted to remove at least oxygen from the working fluid.

The purifier may be adapted to remove at least hydrogen from the working fluid.

Thus, when the working fluid is helium, used in a helium circuit which passes through the working component, if contaminant fluid from the compressor or elsewhere in an engine, such as by way of hydrogen diffusion into helium in a hydrogen/helium heat exchanger, should reach an entrance to the working fluid recovery system (such as if it reaches a recovery space between seals sealing a turbine and compressor of the rotating machine), which contaminant fluid may include oxygen or hydrogen, the purifier may remove such contaminants, such as before the leaked working fluid is injected back into the helium circuit, for example at an outlet of the turbine of a turbomachine.

A further aspect provides a machine comprising a helium fluid rotor drivingly connected by a shaft to a non-helium fluid rotor, a shaft seal between said rotors, the turbomachine being adapted to operate with a pressure gradient along the shaft with a higher pressure on a helium fluid rotor side of the shaft seal than on a non-helium fluid side of the shaft seal.

A further aspect of the invention provides an engine which includes a rotational machine as set out in any one or more of the previous aspects hereof.

The engine may have a circuit therein adapted for the circulation of gaseous helium, the circuit passing through a helium turbine of the turbomachine.

The engine may be adapted to compress air such as for use in combustion, the engine having an air path therethrough which passes through an air compressor of the turbomachine, the air compressor being driven by the helium turbine.

The engine may be adapted for engine ignition into an air-breathing mode thereof in which it is adapted to produce motive thrust in continuous operation at zero air speed.

A further aspect of the invention provides a flying machine including an engine adapted to provide motive thrust thereto, the engine being as set out in the previous aspect hereof.

The flying machine may have a fuselage with aerodynamic control surfaces adapted to operate together with the engine for a controlled horizontal take-off from zero airspeed with the engine in the air-breathing mode.

BRIEF DESCRIPTION OF THE DRAWINGS

The present invention may be carried out in various ways and a preferred embodiment of a turbomachine in accordance with the invention will now be described by way of example only and with reference to the accompanying drawings, in which.

DETAILED DESCRIPTION

Figure 1:
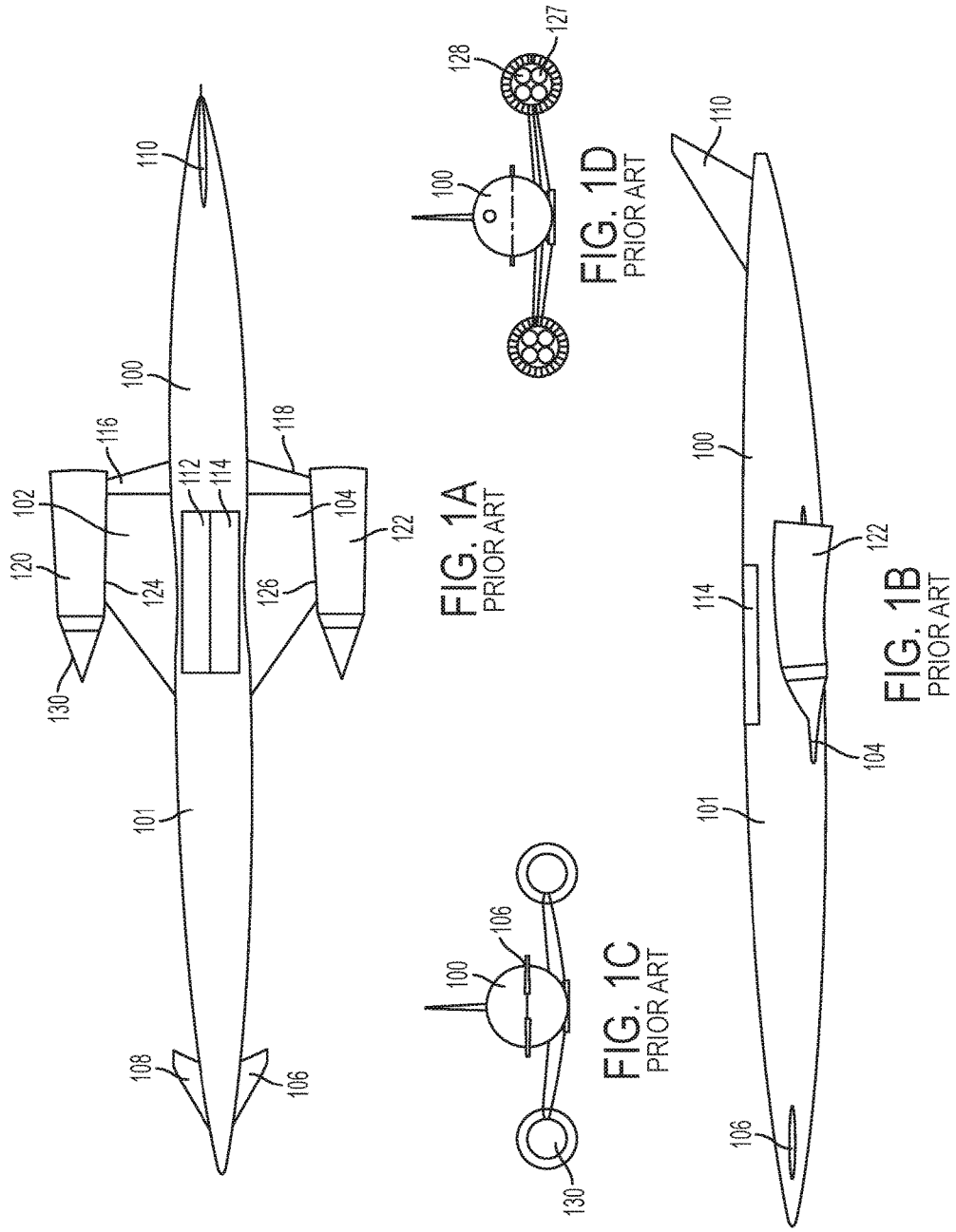
FIGS. 1A to 1D show respective top plan, side elevation, front elevation and rear elevation view of a preferred embodiment of a flying machine incorporating preferred engines with preferred turbomachines in accordance with the invention.

FIG. 1A shows an aircraft 100 with fuselage 101 to which are connected main wings 102, 104, front all-moving canards 106, 108 and rear all-moving tailplane 110. The fuselage 101 has a retractable tricycle undercarriage (not shown) which is retracted in the figures and a payload area under payload doors 112, 114. The main wings have elevons 116, 118 at trailing edges thereof and engines 120, 122 on wing tips 124, 126 thereof.

Figure 2:
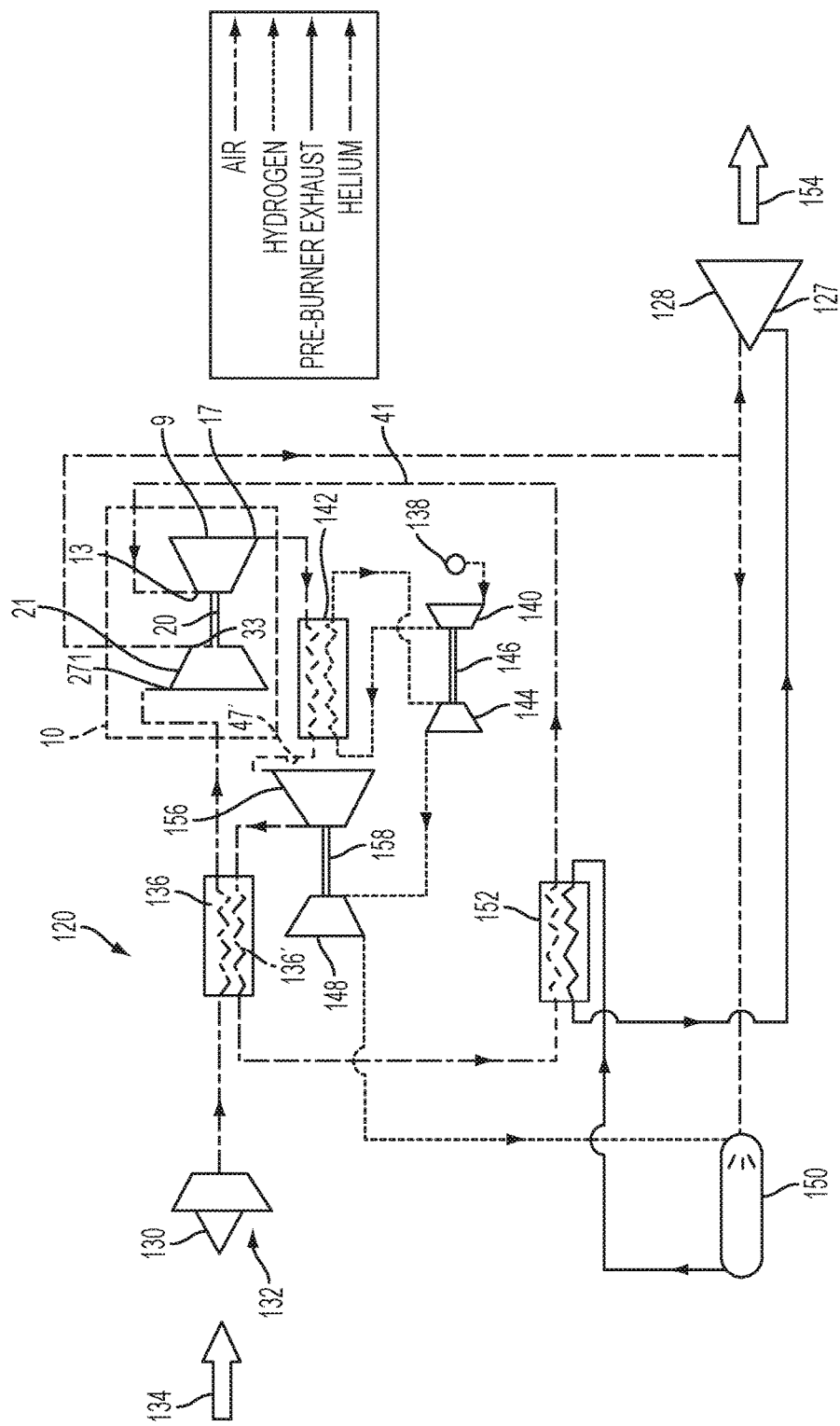
FIG. 2 shows a schematic cycle diagram for each of the engines shown in FIG. 1.

As shown in FIG. 1D, each engine 120, 122 has four rearwardly-facing rocket nozzles 128. FIG. 1A shows each engine in a full rocket configuration thereof in which hydrogen and oxygen are lead towards rocket nozzles 127 of combustion chamber/nozzles 128 for combustion in combustion chambers (not shown) to provide thrust. A nosecone 130 of each engine is retractable to form an annular air inlet 132 (FIG. 2). When the aircraft is stationary on the ground on a runway (not shown), the nosecones 130 are configured in this retracted position to allow the engines 120, 122 to start so as to combust hydrogen in air to provide thrust. The aircraft 100 may take off horizontally, retract the undercarriage and climb in the air-breathing mode to about 10 km of altitude and a speed of Mach 5, and convert into a full rocket mode in which the same rocket nozzles 127 are used for thrust after the combustion of hydrogen in oxygen (carried on board in a liquid oxygen store) and in which the nosecones 130 are extended to the configuration of FIG. 1A in which each air inlet 132 is closed. In this full rocket mode, the aircraft may accelerate out of the atmosphere into orbit in order to carry out orbit operations, such as cargo delivery or recovery. The aircraft 100 may then perform a retro thrust (for example by using additional thrust components (not shown) against the direction of motion in order to re-enter the atmosphere, whereupon it may glide to a horizontal landing.

As shown in FIG. 2, when the aircraft 100 is operated within the atmosphere in an air-breathing mode, the incoming air flow denoted by arrow 134 may enter the air inlet 132, whereupon the flow is slowed (relative to the aircraft 100) and thus heated (e.g. up to about 1000 to 1250 degrees K) prior to passing through a pre-cooler heat exchanger 136, the air then being compressed in compressor 21 of turbo-compressor 10 prior to delivery of a portion thereof to rocket combustion chamber/nozzle 128.

At the same time, hydrogen flow from a hydrogen source 138 passes through hydrogen pump 140, before being heated in heat exchanger 142 then passing through hydrogen turbine 144 (which provides torque along shaft 146 to hydrogen pump 140. The hydrogen then flows through a further hydrogen turbine 148 to a pre-burner 150 where some of the hydrogen is combusted with a portion of the air that leaves the compressor 21 on its way towards combustion chamber/nozzle 128. The pre-burner combustion-heated products leaving the pre-burner 150, which include un-combusted hydrogen, then pass through a heat exchanger 152 where they are cooled (and transfer energy into a helium circuit 41), then to the combustion chamber/nozzle 128 for combustion, the combustion products exiting the engine 120 as a rocket exhaust flow denoted by arrow 154 in order to provide thrust to the aircraft 100.

Whereas FIG. 1D shows that, actually, each engine 120, 122 has four rocket nozzles, FIG. 2 only shows one of these as part of the combustion chamber/nozzle 128 for the purposes of clarity.

At the same time, the helium circuit 41 is operated. In particular, helium flow 19 (shown in FIG. 3) leaves turbine outlet 17 of turbocompressor 10, then passes through heat exchanger 142 (where it is cooled and heats hydrogen), then passes through helium circulation compressor 156 which is supplied with torque along shaft 158 from hydrogen turbine 148. The helium flow then passes through heat exchanger 152 where it is heated (by combustion products on the way from pre-burner 150 to combustion chamber/nozzle 128), whereby energy is introduced into the helium circuit. The helium flow passes from the heat exchanger 152 back to turbine inlet 13 of turbine 9, the helium turbine 9 driving air compressor 21 via shaft 20.

Figure 3:
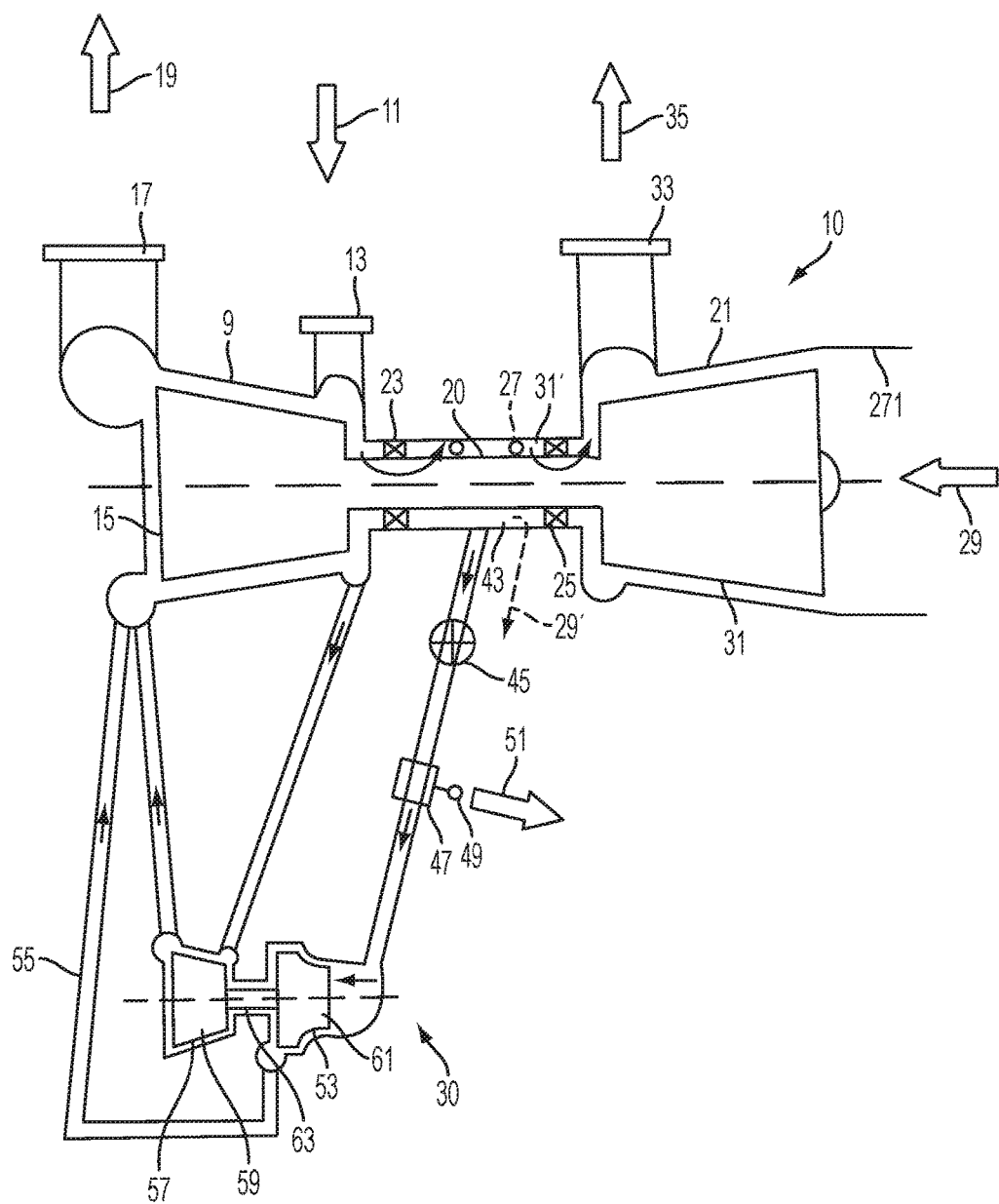
FIG. 3 is a schematic view of the preferred turbomachine used in the engines of FIGS. 1A to 1D and FIG. 2.

FIG. 3 shows one example of the present arrangement for helium recovery. The main turbo-compressor of the engine is shown at 10. High pressure helium enters the turbine 9 as schematically indicated by arrow 11 at turbine inlet 13 at approximately 200 bar, expands and drives turbine rotor 15, and then exits via turbine outlet 17 at approximately 40 bar in the direction schematically indicated by arrow 19.

Compressor 21 ingests air at inlet 271 as indicated schematically by arrow 29 which passes compressor rotor 31 and exits the compressor 21 at outlet 33 as indicated schematically by arrow 35.

Shaft 20 of the turbo-compressor 10 transmits drive from the turbine 9 to compressor 21 and has seals at either end (turbine seal 23 and compressor seal 25) to minimise the leakage of gas.

As will be understood, however, in practice these seals 23, 25 will not be perfect and so some leakage will occur. In order to avoid air entering and contaminating the helium circuit 41, the arrangement is such that helium at the inlet 13 of the turbine is at higher pressure than air at the outlet 33 of the compressor 21. This maintains a pressure gradient along the shaft from the turbine 9 to the compressor 21 such that any leakage would tend to be from the turbine 9 to the compressor 21 past seals 23, 25.

As will be seen from FIG. 3, helium that has leaked from the turbine to a recovery space 43 around the shaft 20 and between the seals 23, 25 is drawn off.

This drawn-off helium is recompressed at recompressor 45 using an existing technique. Any air and hydrogen (hydrogen is used elsewhere in the engine) present in the recompressed helium is removed at purifier 47 via purifier outlet 49 as schematically shown by arrow 51; although, as mentioned, the pressure gradient referred to above will mean that contamination of the helium is low.

The purified helium is then drawn through a compressor 53 of an auxiliary turbo-compressor 30 to compress the helium, with the outlet of that compressor 53 being coupled via a conduit 55 to the outlet 17 of the turbine 9 of the main turbo-compressor 10. The auxiliary compressor 53 is driven by helium taken off from the inlet 13 of the turbine 9 of the main turbo-compressor 10, which passes through auxiliary turbine 57 with the outlet of the auxiliary turbine also being coupled to the outlet 17 of the turbine 9 of the main turbo-compressor 10. The auxiliary turbine 57 has a rotor 59 thereof drivingly connected to a rotor 61 of the auxiliary compressor 53 by a drive shaft 63.

Thus, helium leaking to the recovery space or cavity 43 around the shaft 20 of the main turbo-compressor 10 between seals 23, 25 is recaptured and re-enters the main helium circuit at the outlet 17 of the turbine 9 of the main turbo-compressor 10.

A similar helium recapture arrangement may also be used at the turbocompressor made up by the hydrogen turbine 148, shaft 158 and helium circulator/compressor 156 in order to avoid leakage of hydrogen into the helium circuit.

The turbo compressor 10 may be modified such that a further shaft seal 27 (shown in dotted lines in FIG. 3) is added. In this case pressure between seals 23,27 may be maintained at about 2 Bar and pressure between seals 27,25 at about 1 Bar, with pressure on the compressor side of the seal 25 considerably higher, e.g. 15 to 100 Bar. Thus, leakage from compressor 31 past seal 25 is drawn off via conduit 29' (schematically shown in dotted lines) in a 1-Bar space 31' and helium is drawn from 2-Bar space 43. Any slight leakage past seal 27 is from helium into air (from left to right in FIG. 3) such that the helium in the helium circuit is not contaminated.

In a further embodiment, the turbine 15 or compressor 31 may be replaced, for example by an alternator/generator or motor. Thus, in one embodiment, the components to the right of the seal 25 in FIG. 3 may be entirely replaced with a generator adapted to be powered by the turbine 15 and in another embodiment the components to the left of the seal 23 in FIG. 3 may be replaced with a motor adapted to drive the compressor, with other arrangements being put in place for purifying the working fluid and returning the working fluid which has been drawn off from the space 43 to the helium circuit.

In another embodiment, the embodiment of FIG. 3 could be adapted by replacing the means for recompressing the helium and the turbo compressor 30 with a reciprocating compressor driven by an electric motor. The auxiliary turbo compressor 30 is therefore not essential.

Since the helium circuit has its working fluid (helium) in a closed loop, a make-up tank to make-up for leakage is not essential. A make-up tank may be provided but the quantity of make-up fluid (gaseous helium) can be minimised.

It is not essential to have helium as the working fluid in all embodiments in accordance with this invention and other working fluids could be used with a similar working fluid recovery system and/or purification.

As well as being applicable to turbomachines like the turbomachine 10 shown in FIG. 3, the invention may be used in other cases when a working fluid may leak in a region of a connector such as a shaft, such as in the case of a regenerator or a rotating heat exchanger like a rotating periodic flow heat exchanger.

The recovery compressor could be driven in many different ways including direct drive from the main shaft 20 in other embodiments or through a gear box.

The purifier 47 may comprise or include a palladium filter with a vacuum pump, enabling hydrogen to be drawn off from the leaked working fluid but not helium. Thus, the helium may be purified. An advantage of using a palladium means for separating the hydrogen off from the helium is that it may be used repeatedly, such as on one flight after another when the turbine machine is used as part of the componentry of a flying machine. An alternative purifier incorporates a getter such as pyrophoric uranium or titanium for removing hydrogen from the flow.

The purifier substantially overcomes the problem of hydrogen leaking/defusing through heat exchangers in the engine 120 into helium since the hydrogen can embrittle other components in the helium circuit.

An advantage of the use of the three seals 23, 27,25, including the seal 27, is that this isolates the two working fluids of the turbine and compressor with the third seal 27. The pressure in the space 31' is below the pressures in the two adjacent spaces to ensure that leakage is in the correct direction away from the helium rather than into the helium.

Instead of placing the purifier 47 in the working fluid recovery system, the purifier 47 may be placed in the main helium circuit 41. For example, a purifier 47' (shown in dotted lines in FIG. 2) like the purifier 47 may be placed in the main helium loop after the heat exchanger 142, because this is a hydrogen/helium heat exchanger where hydrogen diffusional leakage into the helium may occur. Likewise, the purifier may instead be placed just after the helium circulator compressor 156 or the heat exchanger 136 in the helium circuit. Both of these positions are before the heat exchanger 136 which may include nickel-based alloys in the helium-containing conduits 136', the heat exchanger 152 and turbine 9 which could become embrittled by the hydrogen. The compressor 156 generally runs at relatively low temperature so is not so sensitive to hydrogen embrittlement as other components in the helium circuit. The purification of the helium is thus highly advantageous since it avoids the embrittlement of components in the engine due to hydrogen contamination.

Various modifications may be made to the embodiment described without departing from the scope of the invention.

The invention claimed is:

1. A rotational machine having a working component for communicating a working fluid from an inlet to an outlet thereof, comprising:
    a turbine having a turbine rotor and a compressor having a compressor rotor, the turbine rotor and the compressor rotor being connected by a connector; and
    a working fluid recovery system for the recovery of a first working fluid in the region of the connector;
in which:
    the connector is adapted to form at least part of a drive connection between the turbine and the compressor;
    the connector comprises a rotatable shaft and in which a first shaft seal is provided for substantially sealing the first working fluid against transmission thereof along the shaft;
    the compressor is adapted to compress a second working fluid; and
    the working fluid recovery system comprises at least one recovery compressor and a recovery turbine, in which the recovery turbine has an inlet path adapted to draw the first working fluid from an inlet region of the turbine of the working component and/or an outlet path adapted to supply the first working fluid to an outlet region of the turbine of the working component, and in which a recovery turbine rotor is connected to a drive shaft driving a recovery compressor rotor of the recovery compressor.

2. A rotational machine as claimed in claim 1, which comprises a turbomachine which is adapted to operate with the first working fluid in a closed circuit.

3. A rotational machine as claimed in claim 1, which is adapted to operate with helium as the first working fluid.

4. A rotational machine as claimed in claim 1, in which the second working fluid is air.

5. A rotational machine as claimed in claim 1, in which the first shaft seal is located fluidly between one of said turbine and compressor rotors and an inlet to the working fluid recovery system.

6. A rotational machine as claimed in claim 1, which is adapted to operate with a first pressure on a rotor side of the first shaft seal higher than a second pressure on a lower pressure side of the first shaft seal.

7. A rotational machine as claimed in claim 6, in which the first shaft seal, on a side thereof facing said one of said turbine and compressor rotors, is adapted to be subjected to a seal pressure substantially equal to pressure at a working fluid region of the working component.

8. A rotational machine as claimed in claim 7, which further comprises:
    a second shaft seal and a third shaft seal, the working fluid recovery system being adapted to draw leaked fluid from between the first shaft seal and one of the second or third shaft seals, the pressure in a chamber between the other one of the second or third shaft seals and the first shaft seal being maintainable at lower than the pressure between the first shaft seal and the other one of the second or third shaft seals; and
    a conduit to draw off leakage into the chamber between the first shaft seal and the other one of the second or third shaft seals.

9. A rotational machine as claimed in claim 6, in which the recovery compressor has an inlet path adapted to draw fluid from a recovery space bounded at least partly by the lower pressure side of the first shaft seal and/or an outlet path adapted to supply the first working fluid to an outlet region of the working component.

10. A rotational machine as claimed in claim 9, comprising a second shaft seal and in which the recovery space is between the first shaft seal and the second shaft seal.

11. A rotational machine as claimed in claim 1, in which the drive shaft is adapted to transmit torque from the recovery turbine rotor to the recovery compressor rotor.

12. A rotational machine as claimed in claim 1, in which the working fluid recovery device comprises a purifier for removing contaminants from the first working fluid.

13. A rotational machine as claimed in claim 12, in which the purifier is adapted to remove at least oxygen from the first working fluid.

14. A rotational machine as claimed in claim 12, in which the purifier is adapted to remove at least hydrogen from the first working fluid.

15. A rotational machine as claimed in claim 12, in which the purifier comprises a palladium component adapted to remove hydrogen from helium.

16. A rotational machine as claimed in claim 1, in which:
the turbine rotor is a helium fluid rotor, and the compressor rotor is a non-helium fluid rotor;
the rotatable shaft drivingly connects the helium fluid rotor to the non-helium fluid rotor; and
the rotational machine is adapted to operate with a pressure gradient along the shaft drivingly connecting the helium and non-helium fluid rotors, with a higher pressure on a helium fluid side of the first shaft seal than on a non-helium fluid side of the first shaft seal.

17. An engine comprising a rotational machine as claimed in claim 16.

18. An engine as claimed in claim 17, wherein the turbine is a helium turbine, and further comprising a circuit passing through the helium turbine, the circuit adapted for the circulation of gaseous helium.

19. An engine as claimed in claim 18, wherein the engine is adapted to compress air for use in combustion, the engine comprising an air path therethrough which passes through the compressor which comprises an air compressor of the rotational machine, the air compressor being driven by the helium turbine.

20. An engine as claimed in claim 17, which is adapted for engine ignition into an air-breathing mode in which it is adapted to produce motive thrust in continuous operation at zero air speed.

21. A flying machine, comprising an engine adapted to provide motive thrust thereto, the engine being as claimed in claim 17.

22. A flying machine as claimed in claim 21, further comprising a fuselage with aerodynamic control surfaces adapted to operate together with the engine, wherein the engine is adapted for engine ignition into an air-breathing mode in which it is adapted to produce motive thrust in continuous operation at zero air speed for a controlled horizontal take-off from zero airspeed with the engine in the air-breathing mode.

* * * * *